(12) United States Patent
Chandrasekaran

(10) Patent No.: US 7,962,453 B2
(45) Date of Patent: Jun. 14, 2011

(54) DYNAMIC REDISTRIBUTION OF A DISTRIBUTED MEMORY INDEX WHEN INDIVIDUAL NODES HAVE DIFFERENT LOOKUP INDEXES

(75) Inventor: Sashikanth Chandrasekaran, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 324 days.

(21) Appl. No.: 11/000,818

(22) Filed: Nov. 30, 2004

(65) Prior Publication Data

US 2005/0240595 A1 Oct. 27, 2005

(51) Int. Cl.
*G06F 7/00* (2006.01)
*G06F 17/00* (2006.01)

(52) U.S. Cl. .......................................... 707/650; 707/653

(58) Field of Classification Search .................... 707/10, 707/640, 650, 653
See application file for complete search history.

(56) References Cited

U.S. PATENT DOCUMENTS

| | | | |
|---|---|---|---|
| 4,972,316 A | | 11/1990 | Dixon et al. |
| 5,440,732 A | * | 8/1995 | Lomet et al. ..................... 707/1 |
| 5,581,737 A | | 12/1996 | Dahlen et al. |
| 5,596,754 A | | 1/1997 | Lomet |
| 5,612,865 A | * | 3/1997 | Dasgupta ........................ 700/79 |
| 5,649,196 A | | 7/1997 | Woodhill et al. |
| 5,758,359 A | | 5/1998 | Saxon |
| 5,768,532 A | | 6/1998 | Megerian |
| 5,778,395 A | | 7/1998 | Whiting et al. |
| 5,829,001 A | | 10/1998 | Li et al. |
| 5,949,876 A | | 9/1999 | Ginter et al. |
| 6,014,669 A | | 1/2000 | Slaughter et al. |
| 6,038,563 A | | 3/2000 | Bapat et al. |
| 6,041,384 A | | 3/2000 | Waddington et al. |
| 6,058,389 A | | 5/2000 | Chandra et al. |
| 6,081,900 A | | 6/2000 | Subramaniam et al. |
| 6,108,654 A | | 8/2000 | Chan et al. |
| 6,112,315 A | | 8/2000 | Kuruvila et al. |
| 6,151,688 A | * | 11/2000 | Wipfel et al. ................... 714/48 |
| 6,253,273 B1 | | 6/2001 | Blumenau |
| 6,256,773 B1 | | 7/2001 | Bowman-Amuah |
| 6,272,491 B1 | * | 8/2001 | Chan et al. ........................ 707/8 |
| 6,314,114 B1 | | 11/2001 | Coyle et al. |

(Continued)

OTHER PUBLICATIONS

Oracle Corporation, "Cache Fusion and the Global Cache Service," Oracle9i Application Clusters Concepts, Release 2 (9.2), Part No. A96597-01, 1998, 2002, http://download-west.oracle.com/docs/cd/B10501_01/rac.920/a96597/pslkgdtl.htm#20495, data retrieved Aug. 6, 2004, pp. 1-6.

(Continued)

*Primary Examiner* — Robert Timblin
*Assistant Examiner* — Mariela Reyes
(74) *Attorney, Agent, or Firm* — Hickman Palermo Truong & Becker LLP; Deborah L. Caswell

(57) ABSTRACT

Techniques for performing window-by-window remastering are described, in which the mechanism used by nodes to determine the resource-to-window mapping is separated from the mechanism used by the nodes to access resource information. For example, all nodes of a multiple-node system may use the same hash function to determine which resources are involved in a remastering window. However, the resource indexes employed by the nodes to access resource information need not use that same hash function. For example, in nodes where the resource indexes are hash indexes, different nodes may use different hash functions. Further, some or all of the nodes may use mechanisms other than hash indexes to access the resource information.

24 Claims, 2 Drawing Sheets

U.S. PATENT DOCUMENTS

| | | | |
|---|---|---|---|
| 6,341,340 | B1 | 1/2002 | Tsukerman et al. |
| 6,381,627 | B1 | 4/2002 | Kwan et al. |
| 6,449,734 | B1 | 9/2002 | Shrivastava et al. |
| 6,453,404 | B1 | 9/2002 | Bereznyi et al. |
| 6,496,865 | B1 * | 12/2002 | Sumsion et al. ............ 709/229 |
| 6,496,949 | B1 | 12/2002 | Kanevsky et al. |
| 6,529,906 | B1 * | 3/2003 | Chan ............................ 707/8 |
| 6,618,744 | B1 | 9/2003 | Simmons et al. |
| 6,668,270 | B1 | 12/2003 | Simmons et al. |
| 6,708,198 | B1 | 3/2004 | Simmons et al. |
| 6,715,146 | B1 | 3/2004 | Simmons et al. |
| 6,751,616 | B1 | 6/2004 | Chan |
| 6,920,454 | B1 | 7/2005 | Chan |
| 7,085,911 | B2 | 8/2006 | Sachedina et al. |
| 7,376,744 | B2 | 5/2008 | Loaiza et al. |
| 7,389,292 | B2 | 6/2008 | Prakash |
| 2002/0097724 | A1 * | 7/2002 | Halme et al. ............... 370/392 |
| 2002/0147733 | A1 | 10/2002 | Gold et al. |
| 2003/0163597 | A1 * | 8/2003 | Hellman et al. ............ 709/316 |
| 2004/0243578 | A1 | 12/2004 | Chan et al. |
| 2005/0022047 | A1 * | 1/2005 | Chandrasekaran ............. 714/4 |
| 2005/0149540 | A1 | 7/2005 | Chan et al. |
| 2007/0110047 | A1 * | 5/2007 | Kim ............................ 370/389 |

OTHER PUBLICATIONS

Oracle Corporation, "High Availability Concepts and Best Practices in Real Application Clusters," Oracle9*i* Real Application Clusters Concepts, Release 2 (9.2), Part No. A96597-01, 1998, 2002, http://download-west.oracle.com/docs/cd/B10501_01/rac.920/a96597/pshavdtl.htm#15424, data retrieved Aug. 6, 2004, pp. 1-20.

Dye, Charles, "Multi-Master Replication," Oracle Distributed Systems, Chapter 12, O'Reilly and Associates, Apr. 1999, 54 pages.

Mahapatra, Tushar et al., "Maintaining a Failover Database", Oracle Parallel Processing, Section 12.1, ProQuest Information and Learning, O'Reilly and Associates, Aug. 2000, 6 pages.

* cited by examiner

DYNAMIC REDISTRIBUTION OF A DISTRIBUTED MEMORY INDEX WHEN INDIVIDUAL NODES HAVE DIFFERENT LOOKUP INDEXES

RELATED APPLICATIONS

Field of the Invention

The present invention relates to managing resources and, more specifically, to techniques for changing the responsibility of resources, on a window-by-window basis, within a multiple-node system.

BACKGROUND

Most computer systems manage resources. The nature of the resources managed by a computer system may vary from system to system. For example, in database systems, the resources managed by the system may include tables, rows, and disk blocks. In file systems, the resources managed by the system may be files and folders.

Often, it is desirable to maintain resource information about resources that are managed by a system. Just as the nature of resources may vary from system to system, so may the type of resource information that is maintained about the resources. For example, in a database system, it is often necessary to regulate access to shared resources. Thus, such systems typically maintain resource information that indicates what locks have been requested and/or granted on shared resources. In other systems, the resource information may simply be values that indicate some information about the resources.

Systems that maintain information about resources typically include access structures for efficiently retrieving the resource information. Even when the resource information is stored in volatile memory, the absence of such access structures may result in unacceptably long delays, especially when accessing the resource information is in the critical path of an operation. Various types of access structures, including hash tables, b-tree indexes, and name-value lookup directories may be used for this purpose. The term "resource index" shall be used herein to generally refer to any type of structure or mechanism used for accessing such resource information.

For increased efficiency, resource indexes (and the resource information itself) may be maintained in volatile memory so that the retrieval of the resource information does not incur the relatively long delays associated with accessing non-volatile storage. However, the techniques described hereafter may be equally applied in systems where the resource indexes and/or the resource information are wholly or partially stored in non-volatile storage.

In multiple-node systems, it is common to distribute the responsibility of maintaining the resource information among the various nodes of the system. For example, each node of a five node system may be responsible for managing the resource information for 20% of the resources used by the system. The node that maintains the resource information for a specific resource is referred to as the "master" of that specific resource. Each node will typically maintain its own volatile resource index to efficiently access the resource information for the resources that the node masters.

Once it has been determined which nodes will master which resources, it may be desirable to change the resource-to-master assignments. An operation that changes the resource-to-master assignments is referred to as a "remastering" operation. Remastering may be necessitated for any number of reasons. One such reason, for example, is to ensure that the master node for a set of resources is the same node that has the affinity of access to the set of resource names or keys.

One problem presented by remastering operations is what to do about the resource information, and the resource indexes that are used to access resource information. Typically, both the resource indexes, and the global resource information that the resource indexes are used to access, must be rebuilt as part of the remastering operation. One approach would be to completely stop or freeze accesses (both reads and writes) to the resource indexes at the start of the remastering operation. After the remastering operation, the existing resource indexes can be deleted, and each resource index can be rebuilt based on information that is available in each node. For example, if the resource information is a locking data structure, then for each resource, each node would send the lock mode held on the resource to the new master node for that resource, so that the new master can rebuild the global resource information. If the resource information is a name-value directory entry for a resource, each node would send the name, value pair to the new master node for the given resource. One disadvantage to this approach is that accesses to the resource index are blocked until the entire index is rebuilt.

Another approach, referred to herein as the "window-based approach", involves dividing the resources into "windows". The windows may correspond, for example, to different ranges of resource names. Once the windows have been established, the remastering may be performed one window at a time. At any given time, the only portion of a resource index that needs to be locked is the portion that is associated with the window of resources that is currently being remastered. Each resource index is then rebuilt one "window" at a time. The window-based approached is described in the Window-based Remastering Application.

The window-based approach described in the Window-based Remastering Application works in the following two cases:

CASE 1: the resource indexes are hash indexes, the hash index on each node uses the same hash function, and the hash tables in each node are the same size.

CASE 2: the resource indexes are hash indexes, the hash index on each node uses the same hash function, and the resource hash tables are of different sizes, but the hash table sizes are a multiple of each other.

As an example of how remastering is performed in case 1, assume that there are 100 hash buckets and that the remastering is going to be performed using 5 windows. In the first window, the system freezes accesses to all resources that hash to buckets 1 . . . 20, and rebuilds this part of the hash table. In the second window, the system would freeze accesses to all resources that hash to buckets 20 . . . 40, and so on. Because each node uses the same hash function, any node that has information pertaining to a resource will send the information for the resource in the same window. For example, if the resource information is a locking data structure, two nodes that have a read lock on a given resource will resend the information regarding the read lock to the new master in the same window (the window to which the resource belongs) and the old master would also have frozen accesses to the old resource in this window and would correctly delete the resource.

As an example of how remastering is performed in case 2, assume that the resource hash tables are of different sizes in each node, but that the sizes of the hash tables are a multiple of each other. In this scenario, the node with the smallest hash table size chooses the boundaries of the window, i.e. the start and end bucket number. Each window is constrained to be a contiguous sequence of buckets. Using the example above, if a node has 200 hash buckets and the smallest node has 100 hash buckets, when the smallest sets the window to be buckets 20 . . . 40 in its hash table, the node with 200 hash buckets would consider buckets 20 . . . 40 and buckets 120 . . . 140 in the window. Because the same hash function is used (i.e. a hash value modulo number of hash table buckets) a resource that hashes to a bucket number between 20 and 40 in the node that has 100 hash buckets is guaranteed to either hash to a bucket number between 20 and 40 or between 120 and 140 in the node that has 200 hash buckets.

While the approach set forth in the Window-based Remastering Application works well in the two cases described above, the constraints imposed by the approach reduce its usefulness. For example, it may be desirable for one or more of the resource indexes to be a b-tree index rather than a hash index. Even when hash indexes are used, it may be desirable to select the size of the hash table of each node based on the memory available in the node, without being restricted by the size of the hash tables used by the other nodes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
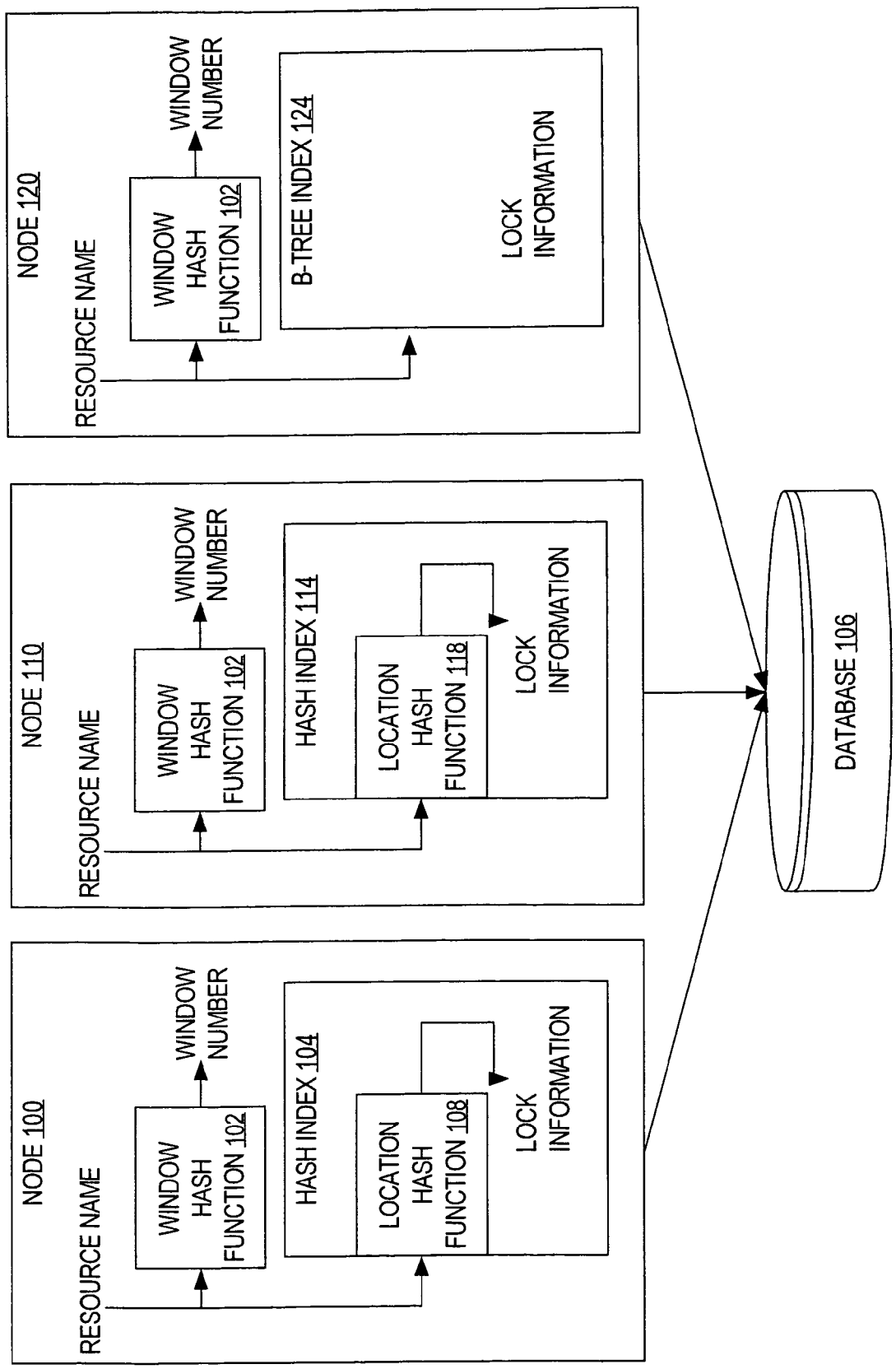
FIG. 1 is a block diagram of a multiple-node system configured to remaster resources on a window-by-window basis using a window hash function according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

The constraints associated the window-based remastering approach described in the Window-based Remastering Application are avoided by separating (1) the mechanism used by nodes to determine the resource-to-window mapping, and (2) the mechanism used by resource indexes to access resource information. According to one embodiment, all nodes of a multiple-node system use the same hash function to determine which resources are involved in a remastering window. However, the resource indexes employed by the nodes to access resource information need not use that same hash function. For example, the resource indexes used by the nodes may be hash indexes with hash tables whose number of buckets is dictated by the amount of memory available. The size of the hash table used by one node may be selected without regard to the hash table sizes of the other nodes. Further, some or all of the nodes may use mechanisms other than hash indexes to access the resource information. For example, some nodes may use hash indexes, others may use b-trees, and others may use name-value directories.

Window and Location Hash Functions

As mentioned above, techniques are provided in which the mechanism used by nodes to determine the resource-to-window mapping is separate from the mechanism used by resource indexes to access resource information. In the context of a multiple-node database system that uses hash indexes to access lock information, two hash functions would be employed by each node. The first hash function, referred to herein as the "window hash function", determines the window number given to a resource name. The second hash function, referred to herein as the "location hash function", determines the location of the resource information in the resource hash table.

The only requirement is that the window hash function returns the same value—the window number—for a given resource in all nodes. In other words, the window hash function cannot be dependent on any node-specific parameters—such as the size of the resource hash table. The window number that is returned by this hash function will be used to determine if a resource needs to be remastered in a given window. The window hash function may, for example, return a value from 1 to w, where w is the total number of windows that the remastering or redistribution operation uses.

According to one embodiment, the redistribution starts from window 1 and is incremented until the window number reaches w. The redistribution is not dictated by the node with the smallest hash table, i.e. the windows are not chosen by specifying a contiguous sequence of hash buckets in the node with the smallest hash table. Hence, a resource that returns the value 1 for the window hash function can be located in hash bucket 10 in a node that has 100 hash buckets, and can be located in hash bucket 43 in another node that also has 100 hash buckets.

There is no constraint on the location of the resource information in the hash tables.

Thus, the location hash function can be arbitrary and can be dependent on node-specific parameters, such as the size of its resource hash table. It need not return the same value on all instances. The location hash function will be used to locate and save the resource information for a given resource name in an instance's resource look-up index.

Non-Hash Resource Indexes

Because the window hash function is separate from the resource index, it is possible for different instances to not only have different location hash functions, but also have totally different resource lookup data structures. For example, one instance may choose to use a hash table for looking up resources and another instance may use a sorted structure such as a B-Tree. As long as all instances return the same window number when the window hash function is applied, the nature of the resource indexes is unconstrained.

When remastering happens in windows, each instance will know what the current window number is. It will consider a resource for remastering in the given window if the window hash function returns the current window number.

Partitioned Resource Indexes

Some lookup index data structures make it easier to identify the list of resources that belong to the current window number. For example, the lookup index could be partitioned by window number—the instance will first use the window hash function to locate the window and then use the location hash function to locate the resource information within the sub-index for that window. The partitioning of the resource indexes may provide improved performance in some situations. However, the general techniques described above do not require that the lookup index be partitioned into sub-indexes based on window number.

Related Hash Functions

As mentioned above, in a multiple-node system that uses hash indexes, each node logically uses two hash functions. However, in some situations, it may not be necessary to actually evaluate two different hash functions. For example, in one embodiment, a node uses a single hash function, and takes the output of the single hash function to determine both the window number and the location for the resource information. For example, if the single hash function returns the value h and there are 8 windows, then the a node could compute mod(h, 8) to determine the window number. The node could then shift h right by three bits (so that those bits are not used again for the location hash function). After the bit shift, the system may use the resulting value as a hash to determine the location for the resource.

Example System

FIG. 1 is a block diagram of a three-node system configured to perform window-based remastering according to an embodiment of the invention. The illustrated system includes three nodes 100, 110 and 120, each of which has access to a database 106. Each of nodes 100, 110 and 120 maintains lock information for the resources of database 106 that are mastered at the node. Further, each of nodes 100, 110 and 120 includes a resource index to access the lock information of the resources that it manages. However, the nature of the resource indexes used by the nodes differs from node to node.

The resource index on node 100 is a hash index 104 that uses a particular location hash function 108 to locate lock information in a hash table. Specifically, node 100 applies location hash function 108 to a resource name to produce a hash bucket number. The hash bucket number is then used to locate, within the hash table, the lock information for the resource.

The resource index on node 110 is also a hash index 114 that uses a particular location hash function 118 to locate lock information. However, the location hash function 118 used by node 110 may be different from the location hash function 108 used by node 100. Because nodes 100 and 110 use different location hash functions, the size of their hash tables may be different. Further, even if their hash tables have the same number of hash buckets, the same resource name may hash to a different bucket number in node 100 than in node 110. The location hash functions 108 and 118 may be independently selected, for example, based on the amount of memory available in each of the nodes.

The resource index on node 120 is a b-tree index 124. Node 120 uses the resource name of a resource to traverse the b-tree index 124 to locate an index entry associated with the resource. The index entry contains, or points to, lock information for the resource.

In addition to resource indexes, each of nodes 100, 110, and 120 includes a window hash function 102. While the nature of the resource indexes vary from node to node, all of the nodes 100, 100, and 120 use the same window hash function 102. During an instance of a window-based remastering operation, each node uses the window hash function 102 to determine which resources are involved in the window. Each of the resource indexes are locked relative to only those resources that window has function 102 maps to the current window. As mentioned above, the locking and rebuilding of any of the resource indexes may be facilitated by partitioning the resource indexes based on the resource-name-to-window-number mapping established by the window hash function 102.

Variations

The window-based remastering techniques described herein, where the hash function used to establish the resource-to-window mapping is independent of the resource indexes used by the nodes, may be applied in a variety of contexts. For example, the types of resources that are being remastered, and the reasons for remastering the resources, may vary from implementation to implementation. Similarly, the nature of the resource indexes, and the nature of the resource information that is indexed thereby, may vary from implementation to implementation. In addition, the resources, the resource information, and the resource indexes, may reside in volatile memory, may be stored on persistent storage, or may have portions within volatile memory and portions on persistent storage.

Hardware Overview

Figure 2:
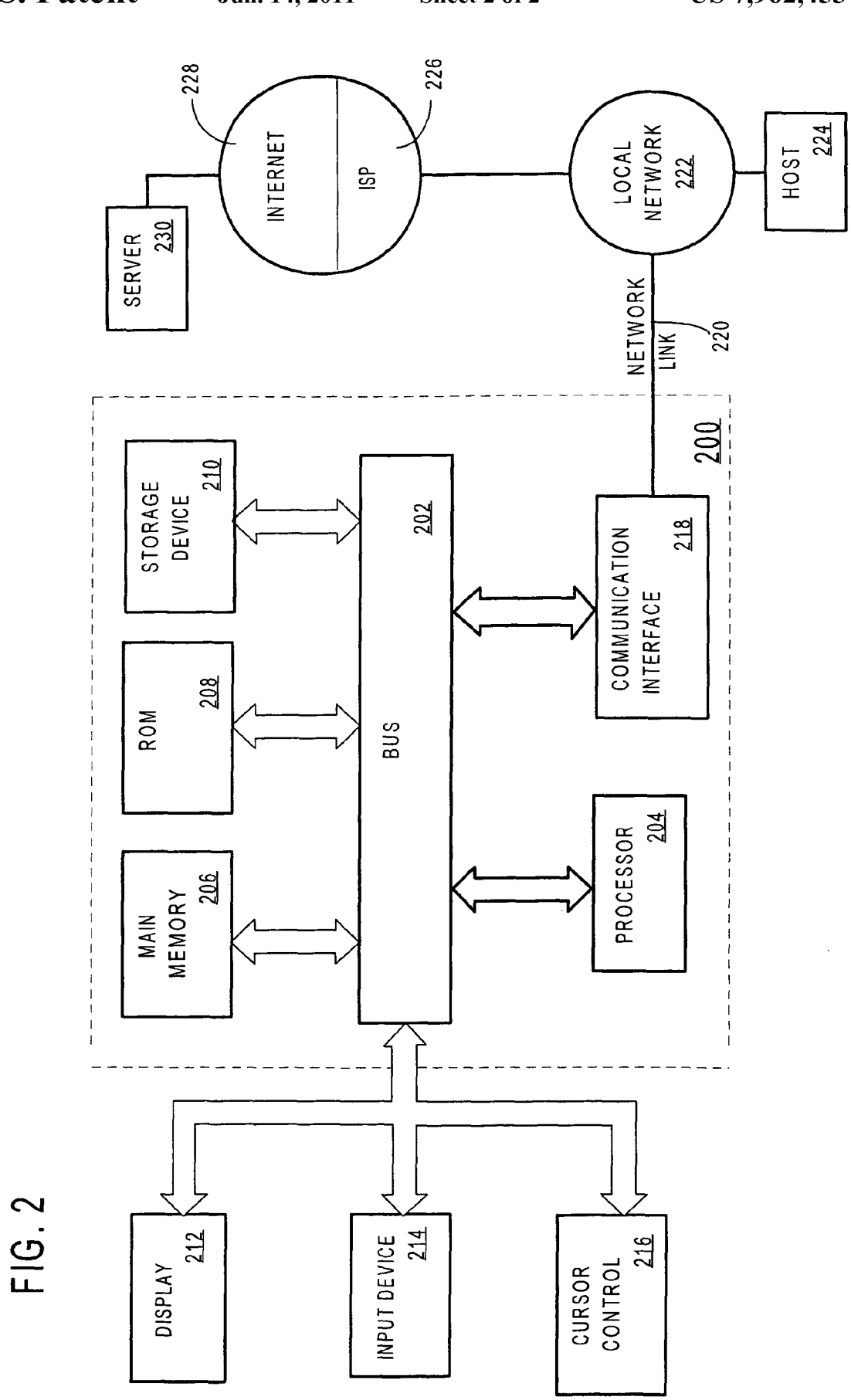
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of redistributing responsibilities for resources in a multiple-node system, the method comprising the steps of:

each node of a plurality of nodes determining a window-resource mapping between resources mastered by said each node and a plurality of windows, each window of the plurality of windows corresponding to a separate set of resources for which responsibility is to be redistributed;

a first node using a first resource index to locate resource information related to the resources mastered by the first node;

wherein the first node is a particular node of the plurality of nodes;

a second node of the plurality of nodes using a second resource index to locate resource information related to resources mastered by the second node;

reassigning from the first node to the second node responsibility for only a first set of resources, wherein the first set of resources correspond to a first window of said plurality of windows and are the responsibility of said first node;

for each window of said plurality of windows that is not the first window, reassigning to a node of the multi-node system responsibility for only a set of resources corresponding to said each window, wherein the corresponding set of resources are the responsibility of said first node;

wherein the window-resource mapping is based on:

(a) a different type of index access structure than that used for the first resource index, or (b) a window hash function, wherein:
the window hash function maps a resource to one of a number of windows of said plurality of windows;
the first resource index is a first hash index that uses a first hash function, and
the first hash function maps a resource to a first number of buckets,
wherein the number of windows is not a multiple or a factor of the first number of buckets.

2. The method of claim 1 wherein the first resource index is based on a b-tree index access structure.

3. The method of claim 1 wherein:
the first resource index is a first hash index that has a first hash table of a first size;
the window hash function is used by a window hash table of a second size;
the first size is different from the second size; and
the first size and the second size are selected independent of each other.

4. The method of claim 1 wherein:
the first resource index is a first hash index; and
the second resource index is not a hash index.

5. The method of claim 1 wherein:
the multiple-node system is a multiple-node database system;
the resources are resources managed by the database system; and
the particular node uses the resource index to access lock information associated with the resources for which the particular node is responsible.

6. The method of claim 5 wherein the resource index and the lock information are stored in volatile memory within the particular node.

7. The method of claim 1 wherein:
the multiple-node system is a multiple-node file system;
the resources include files managed by the file system; and
the particular node uses the resource index to access file information associated with the files for which the particular node is responsible.

8. The method of claim 1 wherein the first resource index is a name-value lookup directory.

9. The method of claim 1 wherein the step of redistributing responsibilities relating to resources between the plurality of nodes in the multiple-node system includes remastering the resources between the plurality of nodes.

10. The method of claim 1,
wherein the window hash function maps a resource to a window number given to a specific resource name; and
wherein the first resource index determines the location of the resource information based on a specific resource name;
wherein the resource information includes information other than a window number or a master node identifier.

11. The method of claim 10, wherein the first resource index is a first hash index;
wherein the first hash index uses a location hash function determines the location of the resource information based on the specific resource name; and
wherein the location hash function is dependent on node-specific parameters.

12. The method of claim 11, further comprising:
wherein each of the plurality of nodes use different location hash functions.

13. The method of claim 10, further comprising:
wherein the location hash function locates and saves resource information for a given resource name in a look-up index.

14. The method of claim 1, wherein the window-resource mapping is based on a different type of index access structure than that used for the first resource index.

15. A computer-readable storage medium storing one or more sequences of instructions which, when executed by one or more processors, causes the one or more processors to perform:
each node of a plurality of nodes determining a window-resource mapping between resources mastered by said each node and a plurality of windows, each window of the plurality of windows corresponding to a separate set of resources for which responsibility is to be redistributed;
a first node using a first resource index to locate resource information related to the resources mastered by the first node;
wherein the first node is a particular node of the plurality of nodes;
a second node of the plurality of nodes using a second resource index to locate resource information related to resources mastered by the second node;
reassigning from the first node to the second node responsibility for only a first set of resources, wherein the first set of resources correspond to a first window of said plurality of windows and are the responsibility of said first node;
for each window of said plurality of windows that is not the first window, reassigning to a node of the multi-node system responsibility for only a set of resources corresponding to said each window, wherein the corresponding set of resources are the responsibility of said first node;
wherein the window-resource mapping is based on:
(a) a different type of index access structure than that used for the first resource index, or
(b) a window hash function, wherein:
the window hash function maps a resource to one of a number of windows of said plurality of windows;
the first resource index is a first hash index that uses a first hash function, and
the first hash function maps a resource to a first number of buckets,
wherein the number of windows is not a multiple or a factor of the first number of buckets.

16. The non-transitory computer-readable storage medium of claim 15, wherein the first resource index is based on a b-tree index access structure.

17. The non-transitory computer-readable storage medium of claim 15, wherein:
the first resource index is a first hash index that has a first hash table of a first size;
the window hash function is used by a window hash table of a second size;
the first size is different from the second size; and
the first size and the second size are selected independent of each other.

18. The non-transitory computer-readable storage medium of claim 15, wherein:
the first resource index is a first hash index; and
the second resource index is not a hash index.

19. The non-transitory computer-readable storage medium of claim 15, wherein:
the multiple-node system is a multiple-node database system;
the resources are resources managed by the database system; and the particular node uses the resource index to access lock information associated with the resources for which the particular node is responsible.

20. The non-transitory computer-readable storage medium of claim 19, wherein the resource index and the lock information are stored in volatile memory within the particular node.

21. The non-transitory computer-readable storage medium of claim 15, wherein:
the multiple-node system is a multiple-node file system;
the resources include files managed by the file system; and
the particular node uses the resource index to access file information associated with the files for which the particular node is responsible.

22. The non-transitory computer-readable storage medium of claim 15, wherein the first resource index is a name-value lookup directory.

23. The non-transitory computer-readable storage medium of claim 15, wherein the step of redistributing responsibilities relating to resources between the plurality of nodes in the multiple-node system includes remastering the resources between the plurality of nodes.

24. The non-transitory computer-readable storage medium of claim 15, wherein the window-resource mapping is based on a different type of index access structure than that used for the first resource index.

* * * * *

UNITED STATES PATENT AND TRADEMARK OFFICE
CERTIFICATE OF CORRECTION

| | | |
|---|---|---|
| PATENT NO. | : 7,962,453 B2 | Page 1 of 1 |
| APPLICATION NO. | : 11/000818 | |
| DATED | : June 14, 2011 | |
| INVENTOR(S) | : Chandrasekaran | |

It is certified that error appears in the above-identified patent and that said Letters Patent is hereby corrected as shown below:

In column 1, line 6, above "Field of the Invention" delete "RELATED APPLICATIONS".

In column 2, line 29, delete "window" and insert -- "window" --, therefor.

In column 2, line 34, delete "approached" and insert -- approach --, therefor.

In column 5, line 21, delete "the a" and insert -- the --, therefor.

In column 5, line 64, delete "110," and insert -- 110 --, therefor.

In column 5, line 67, delete "100, and" and insert -- 110 and --, therefor.

In column 6, line 5, delete "has" and insert -- hash --, therefor.

Signed and Sealed this
Twenty-fifth Day of October, 2011

David J. Kappos
*Director of the United States Patent and Trademark Office*